(12) United States Patent
Ormson (10) Patent No.: US 7,224,982 B2
(45) Date of Patent: May 29, 2007

(54) LOCATION SYSTEMS IN CELLULAR COMMUNICATION NETWORKS

(75) Inventor: Richard Ormson, Reading (GB)

(73) Assignee: NEC Corporation, Tokyo (JP)

( * ) Notice: Subject to any disclaimer, the term of this patent is extended or adjusted under 35 U.S.C. 154(b) by 345 days.

(21) Appl. No.: 10/294,677

(22) Filed: Nov. 15, 2002

(65) Prior Publication Data

US 2003/0096624 A1    May 22, 2003

(30) Foreign Application Priority Data

Nov. 16, 2001    (GB)    .................................. 0127569.2

(51) Int. Cl.
*H04Q 7/20*    (2006.01)
(52) U.S. Cl. .............................. 455/456.1; 455/456.2; 455/456.5; 455/12.1; 455/422.1; 342/450
(58) Field of Classification Search .. 455/456.1–456.6, 455/404.2, 433, 422.1; 342/357.01, 357.02, 342/450; 701/207; 340/426.19, 426.2, 539.13
See application file for complete search history.

(56) References Cited

U.S. PATENT DOCUMENTS

| | | | | |
|---|---|---|---|---|
| 4,698,748 | A | * | 10/1987 | Juzswik et al. ............. 713/322 |
| 5,883,598 | A | * | 3/1999 | Parl et al. .................... 342/457 |
| 5,917,449 | A | * | 6/1999 | Sanderford et al. ......... 342/457 |
| 6,385,452 | B1 | * | 5/2002 | Zadeh et al. ................ 455/440 |
| 6,408,246 | B1 | * | 6/2002 | Fox ........................ 342/357.01 |
| 6,529,165 | B1 | * | 3/2003 | Duffett-Smith et al. ..... 342/463 |
| 6,590,881 | B1 | * | 7/2003 | Wallace et al. ............. 370/332 |
| 6,697,629 | B1 | * | 2/2004 | Grilli et al. .............. 455/456.1 |
| 6,741,863 | B1 | * | 5/2004 | Chiang et al. ........... 455/456.1 |
| 7,089,019 | B2 | * | 8/2006 | Ormson ................... 455/456.1 |
| 7,110,774 | B1 | * | 9/2006 | Davis et al. ............. 455/456.1 |

(Continued)

FOREIGN PATENT DOCUMENTS

CN    1211377 A    3/1999

(Continued)

OTHER PUBLICATIONS

Chinese Office Action dated Mar. 12, 2004 with English Translation.

*Primary Examiner*—George Eng
*Assistant Examiner*—Kamran Afshar
(74) *Attorney, Agent, or Firm*—McGinn IP Law Group, PLLC (57) ABSTRACT

A location system in a cellular communication network has a first set of base stations which transmits and receives signals in a first communication format. The second set of base stations transmits and receives signals in a second communication format. All the base stations transmit known signals at predetermined times for use in deriving location data. A transmitting and receiving unit of the known location determines the times of arrivals of these signals from each base station in each set of base stations. Similarly, a mobile unit at an unknown location determines the times of arrival of the signals from each base station. By comparing timing differences between signals received at the unknown location and signals received at the known location, it is possible to determine the unknown location therefrom. This can then be transmitted back to either of the sets of base stations. In a situation where two communication networks are used, the mobile units will be dual mode transmitting and receiving units.

18 Claims, 4 Drawing Sheets

U.S. PATENT DOCUMENTS

| | | | |
|---|---|---|---|
| 2001/0051527 A1* | 12/2001 | Kuwahara et al. | 455/456 |
| 2001/0053698 A1* | 12/2001 | Karmi et al. | 455/456 |
| 2002/0016172 A1* | 2/2002 | Kangras et al. | 455/456 |
| 2002/0183069 A1* | 12/2002 | Myr | 455/456 |
| 2003/0096622 A1* | 5/2003 | Moilanen | 455/456 |
| 2003/0169725 A1* | 9/2003 | Ahmavaara et al. | 370/352 |
| 2003/0224802 A1* | 12/2003 | Nir et al. | 455/456.1 |
| 2004/0102196 A1* | 5/2004 | Weckstrom et al. | 455/456.1 |
| 2004/0203865 A1* | 10/2004 | Krasner | 455/456.1 |

FOREIGN PATENT DOCUMENTS

| | | |
|---|---|---|
| EP | 1 289 331 A2 | 3/2003 |
| WO | WO 97/30360 | 8/1997 |
| WO | WO9730360 * | 8/1997 |
| WO | WO 98/10538 | 3/1998 |
| WO | WO 02/082850 A1 | 10/2002 |

* cited by examiner

LOCATION SYSTEMS IN CELLULAR COMMUNICATION NETWORKS

BACKGROUND OF THE INVENTION

This invention relates to a location system for use in a cellular communication network.

Cellular communication networks are being continuously developed and upgraded. The operators of these networks are, in combination with this, looking at ways of producing additional sources of revenue. One of these is known as "location based services". These are uses of mobile units in a cellular communication network, such as mobile telephone handsets, that rely upon the network knowing where the handset is. The type of services which can be provided to handsets include local information, map information, traffic reports, etc. The networks see these services as being potentially very lucrative. However, the range of services that can be offered and their usefulness to a user is limited by the accuracy with which the location of a user can be derived.

A number of different mechanisms have been proposed for determining location of mobile units within a cellular communication network. One of the most commonly used is known as Enhanced Offset Time Differential (E-OTD). This system works by measuring at a mobile unit, the time difference between specific signals arriving from different base stations. Three or more base stations are required. This produces an offset between the signals from the different base stations which is reported back to the network. Appropriate processing within the network can then compare the offset with equivalent data from a measurement made at a known fixed location. This comparison then allows the location of the handset to be calculated in relation to the base stations and the fixed location.

Figure 1:
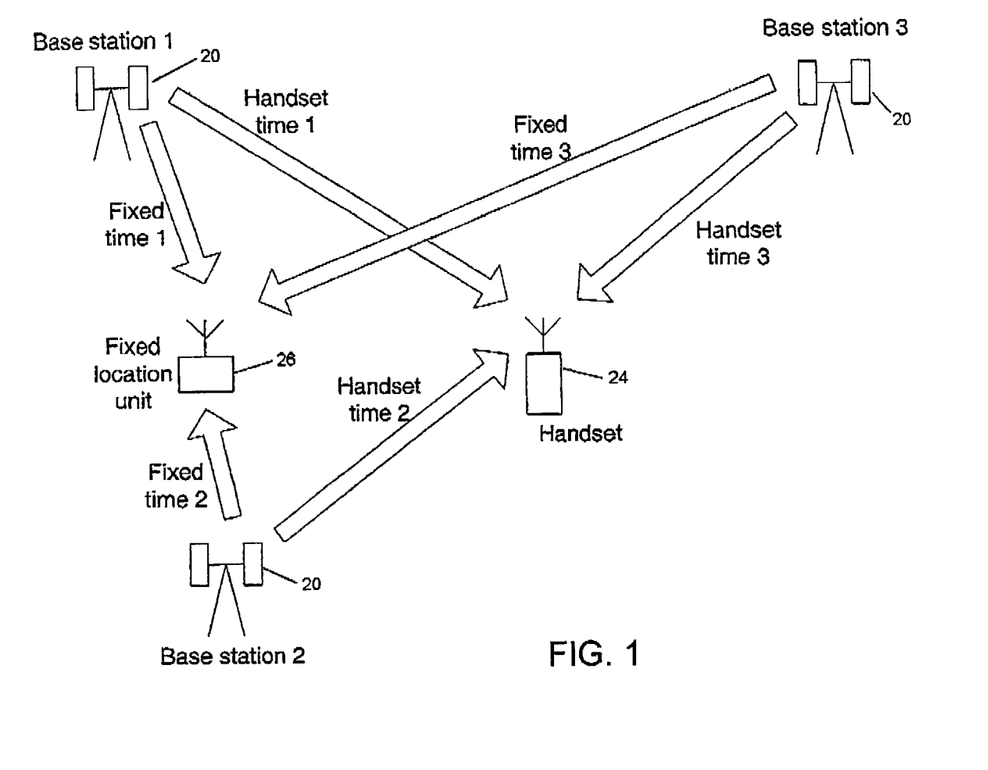
FIG. 1 shows schematically an E-OTD system as described above.

Referring to FIG. 1, the figure shows a simple mobile network comprising three base stations 20. Two units receive signals from the base stations; a mobile handset 24 and a fixed location unit 26. Each of these units measures the time difference between defined signals from each base station. Each unit reports this offset data to the network.

The network knows the locations of all the base stations 20 and of the fixed location unit 26 it is possible to calculate the distance of the handset 24 from each of the three base stations 20. The maths required to perform this calculation is and need not be reproduced here but will be familiar to those skilled in the art.

The output of the calculation is a series of arcs describing the separation between the handset and each base station. There is an inherent error in each arc due to factors such as the accuracy of the measurement. The location of the handset 24 is therefore determined as the center of the overlap of the arcs, subject to an uncertainty of the size of the overlap area.

There are a number of factors which contribute to the accuracy of the determined location. Four of the principle factors are as follows;

1. The accuracy with which an offset measurement can be made. This is a function of the data rate of the network and the sampling speed of the handset. It is not usually possible to alter either of these.
2. The accuracy of the radio propagation model which is held by the cellular network. This is usually limited by the processing power of the network and the availability and accuracy of geographical data on which to work.
3. The number of measurements that are averaged before an offset is reported to the network. The larger the number of measurements averaged, the greater the accuracy, providing the mobile unit is not moving. If the mobile unit is moving, then a larger number leads to a decrease in accuracy.
4. The number of different base stations from which offsets are measured. This is limited by the network design since it is not possible to measure offsets from base stations which are not within the network. One option would be to monitor base stations in rival networks, although this is not a popular option with network operators since it would involve major changes to the "neighbor cell" information that the network provides to a mobile unit.

These limitations make it very difficult to improve the accuracy of E-OTD.

Currently what are known as third generation (3G) cellular communication networks and handsets are being introduced. For a significant period of time there will be a large number of handsets which are known as "dual mode" handsets. That is to say, they are capable of monitoring both 2G and 3G systems. The fact that these dual mode handsets are able to communicate with two cellular communication networks using 2G and 3G radio access technology (RATs) means that the number of base stations monitored can be increased. This can be achieved without making any significant additional complication to the network signalling requirements since the majority of signalling required is already supplied under the 3G network interoperability design.

In addition, dual mode handsets potentially solve a problem in the Universal Mobile transmission Standard (UMTS), which is a spread spectrum system. It is therefore necessary for each cell briefly to stop transmitting to allow a handset to receive signals from other cells from on the same frequency and to measure their time offset. This period is known as Idle Period in Downlink (IPDL). IPDL is complicated in that all handsets in the area have to be made aware that the signals from the cell is going to vanish temporarily and then reappear. The network has to provide processing power to schedule the gaps and the mobile units or handsets must provide processing power to redirect their transmitters and receivers to look for other cells.

IPDL is also inefficient because when the cell is turned off, it is not sending data. Thus network bandwidth is reduced and a potentially billable resource is lost. Furthermore, many UMTS networks and handsets as currently proposed do not support IPDL.

As has been stated, a dual mode handset is capable of monitoring two radio systems. To get a location fixed, only one radio system must be monitored (although more systems lead to better accuracy). Thus, subject to appropriate data conversion being possible, a dual mode UMTS/GSM handset can obtain a location fix using the GSM (Global System for Mobile communication) network signals and escape the need for IPDL and UMTS.

Dual mode handsets are able to operate on both the 2G and 3G networks. By definition a dual mode handset must be capable of receiving signals from both radio systems. There are, however, two types of dual mode handset; those that can operate on both radio systems simultaneously; and those that can only operate on one radio system at a time.

Handsets which can operate on both radio systems simultaneously are able to perform monitoring of the second system without interfering with the first. The latter type require operation on one system to cease while operation on the other proceeds.

The 2G system which is envisaged in the current embodiment of the invention is the GSM cellular communications system and the 3G system contemplated is the UMTS system. Where we have a GSM/UMTS dual mode handset, UMTS can operate in the gaps which are inherent in the GSM time division structure. GSM can then operate by what is known as compressed mode which is a technique that creates gaps in the UMTS data stream to allow monitoring of other radio systems or frequencies. For a mobile to be a dual mode GSM/UMTS, it must be able to operate in one of these ways. Such units are available although they are not currently used or intended to be used in E-OTD.

Specific embodiments of the present invention provide a method for determining the location of dual mode mobile units in a dual mode cellular communications network by deriving location data from both communication networks.

In one embodiment, location information is derived by each mobile unit.

In an embodiment of the invention, there is provided a timer to provide a temporal point of reference between the two cellular networks to overcome differences in the time bases of the different networks.

The invention is defined in more precision in the appended claims to which reference should now be made.

BRIEF DESCRIPTION OF THE DRAWING

Preferred embodiments of the invention will now be described in detail by way of example with reference to the accompanying drawings in which.

E-OTD as currently proposed is capable of working independently in either the GSM or UMTS networks. Nevertheless, the data reported to each network is very similar and takes the following form:

1. The time when the measurement was made (derived from the frame number of the ell serving the mobile unit at the time of the measurement, and the cell in which the mobile unit is located).

2. The identity of the cell currently being monitored for E-OTD signals.

3. The time offset between signals received from the serving cell and the cell being monitored.

As the reporting data is of similar form for both transmission standards, it is not difficult to combine provided that it is all referenced to a common point in time This is where complication arises. There are three main problems associated with combining data from one RAT with data from another, These are as follows:

1. The time bases of the different RATs are different;

2. A dual mode handset is usually connected to only one RAT while it monitors the other. This applies equally when in a call or just in standby mode. Thus, there is no serving cell on the second RAT and therefore no defined timebase against which it may perform offset monitoring;

3. There is currently no mechanism for reporting data measured in one RAT by sending it over a second RAT.

We have appreciated the first of these problems can be dealt with by some data processing supplied in hardware, the second by a change in the operating of the handset, and third by changes to network signalling. Embodiments which solve these problems are described below.

The requirements described below will also have to be used at the network fixed location units which are required in E-OTD to calculate the positions of mobile units. These will need to report dual mode data. Therefore, the techniques which will be described below and are used in the handset must also be built into the network fixed units. If this is not done, then there will be no E-OTD reference data easily available. One option would be to have data from single mode units in each of the two networks combined when the location calculation is formed.

A dual RAT E-OTD system has a number of other requirements. These are already covered by default in a GSM/UMTS dual mode combination but they may require addressing when the technique is applied to other radio access technologies.

Firstly, the handset must know where to look for cells on the alternate RAT. In a situation where the same or cooperative operators deploy the two networks in the same area, each network supplies details of the others local cells. This is useful since it provides to a handset almost all the details needed to make offset measurements on the other RAT.

Secondary, the handset must be able to make E-OTD measurements on the alternate RAT. This is actually very simple to achieve in GSM/UMTS dual mode units as the required signals are already monitored. For GSM this is the BSIC decode, and for UMTS this is part of the synchronization information. Some additional processing power is required but there is no extra radio activity.

The structure of transmissions on each RAT in a dual mode system will be known and well defined and therefore timing conversions between the two can be made as long as there is a point of reference. In a GSM/UMTS combination the time bases can be referenced by performing a simple offset measurement. This measurement records the offset between the start of a transmission frame on each system. In addition, the GSM and UMTS frame numbers at which the measurement was performed must be recorded. If these three pieces of information are available it is then possible to convert between GSM and UMTS time bases as described below.

Figure 2:
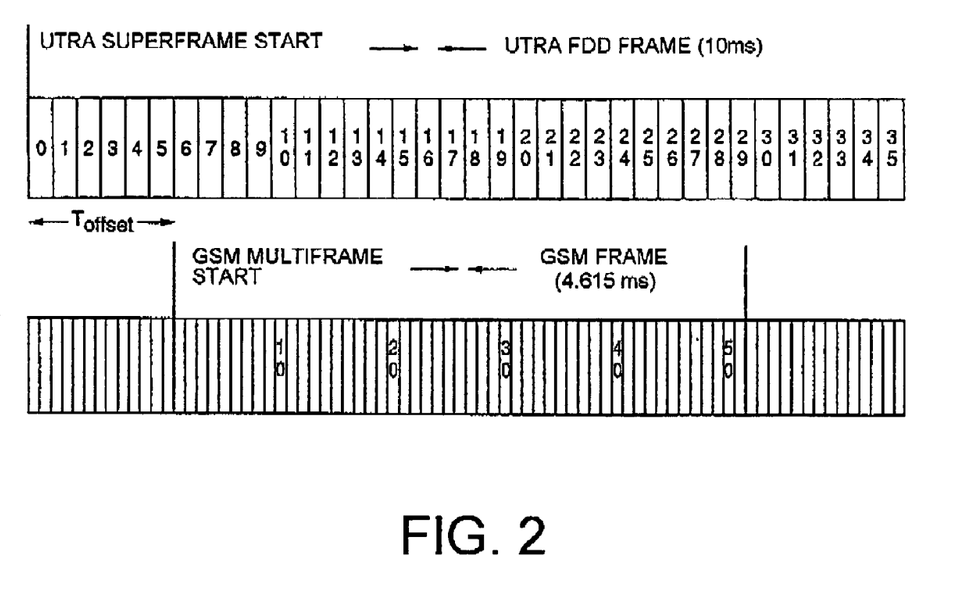
FIG. 2 shows schematically an example of the timing differences which can arise between UMTS and GSM transmission standards.

FIG. 2 shows a UMTS multiframe known as a UTRA superframe and a GSM multiframe starting at a different time to the UTRA superframe. The time difference is $T_{offset}$.

For the purposes of these explanation, the following designations apply:

fn=frame number
fp=frame period
sn=slot number
cn=chip number
sfn=superframe number
pb=quarter bit.

A UMTS frame is 10 ms long and made up of 15 slots each of 10/15 ms. Each slot is made up of 2560 chips each of 10/38400 ms.

Each GSM superframe is 3060/13 ms length and is made up of 51 frames of 60/13 each frame is eight slots of 15/26 ms in length. Each slot is made up of 625 qb numbers of 15/16250 ms in duration.

In order to measure the time $T_{offset}$ in FIG. 1, a knowledge of the frame offset timing and the respective GSM and UMTS frame numbers at which the offset was measured will enable the total offset to be calculated. This can be derived from the following equation:

$$T_{offset} = [(UTRA\_fn \times UTRA\_fp) - (GSM\_fn \times GSM\_fp) + \text{Frame\_Offset}] MOD(51 \times GSM\_fp).$$

In order to define the GSM timebase from that of the UMTS time base, we need to know the elapsed time from the start of the UTRA superframe*. This is given in ms by:

$$GSM\_Time = (\text{Time from start of } UTRA \text{ superframe}) - (T_{offset}).$$

The corresponding GSM superframe, frame, slot and quarter bit numbers can now be calculated into dividing the GSM time by the duration of each and taking an appropriate modulus. This is given in the following equations:

$$GSM\_sfn = INT\left[\frac{GSM\_Time}{(3060/13)}\right]$$

$$GSM\_fn = INT\left[\frac{GSM\_Time}{30/13}\right] MOD(51)$$

$$GSM\_sn = INT\left[\frac{GSM\_Time}{15/26}\right] MOD(8)$$

$$GSM\_qb = \left[\frac{GSM\_Time}{(15/16250)}\right] MOD(625)$$

The UMTS time base can be defined in that of the GSM timebase in a similar manner as shown below:

$$UTRA \text{ Time} = (\text{Time from start of } GSM \text{ multiframe}) + (\text{Length of } N \text{ } GSM \text{ multiframe}) + (T_{offset})$$

which becomes:

$$UTRA\_Time = \left[\left(GSM\_fn \times \frac{60}{13}\right) + \left(GSM\_sn \times \frac{15}{26}\right) + \left(GSM\_qb \times \frac{16}{16250}\right) + \left(N \times 51 \times \frac{60}{13}\right) + T_{offset}\right]$$

The frame slot and chip numbers can then be determined in a manner similar to that shown for GSM and indicated below:

$$UTRA\_fn = INT\left[\frac{UTRA\_time}{10}\right] MOD(4096)$$

$$UTRA\_sn = INT\left[\frac{ITRA\_Time}{10/15}\right] MOD(15)$$

$$UTRA\_chip = \left[\frac{UTRA\_Time}{10/38400}\right] MOD(2560)$$

Thus, it can be seen that by making a simple offset measurement, timebase conversion between RATs is possible. The above example is shown applied specifically to GSM and UMTS RATs but the principle can be applied to any RAT which uses a cyclic transmission scheme.

In order to perform the timebase conversion, we must first know the offset between the two RATs—we need the temporal point of reference denoted frame—reference in the above equations. This is done by using a high resolution timer. This is shown in at reference numeral 2 in FIG. 3. The timer has three inputs, a clock 4, a UMTS interrupt 6 and a GSM interrupt 8. All these signals are present in a dual mode handset. The clock is present for obvious reasons. The UMTS and GSM frame interrupts which occur at the start of each radio frame on the appropriate system are there to ensure that synchronization is maintained with radio operations.

Figure 3:
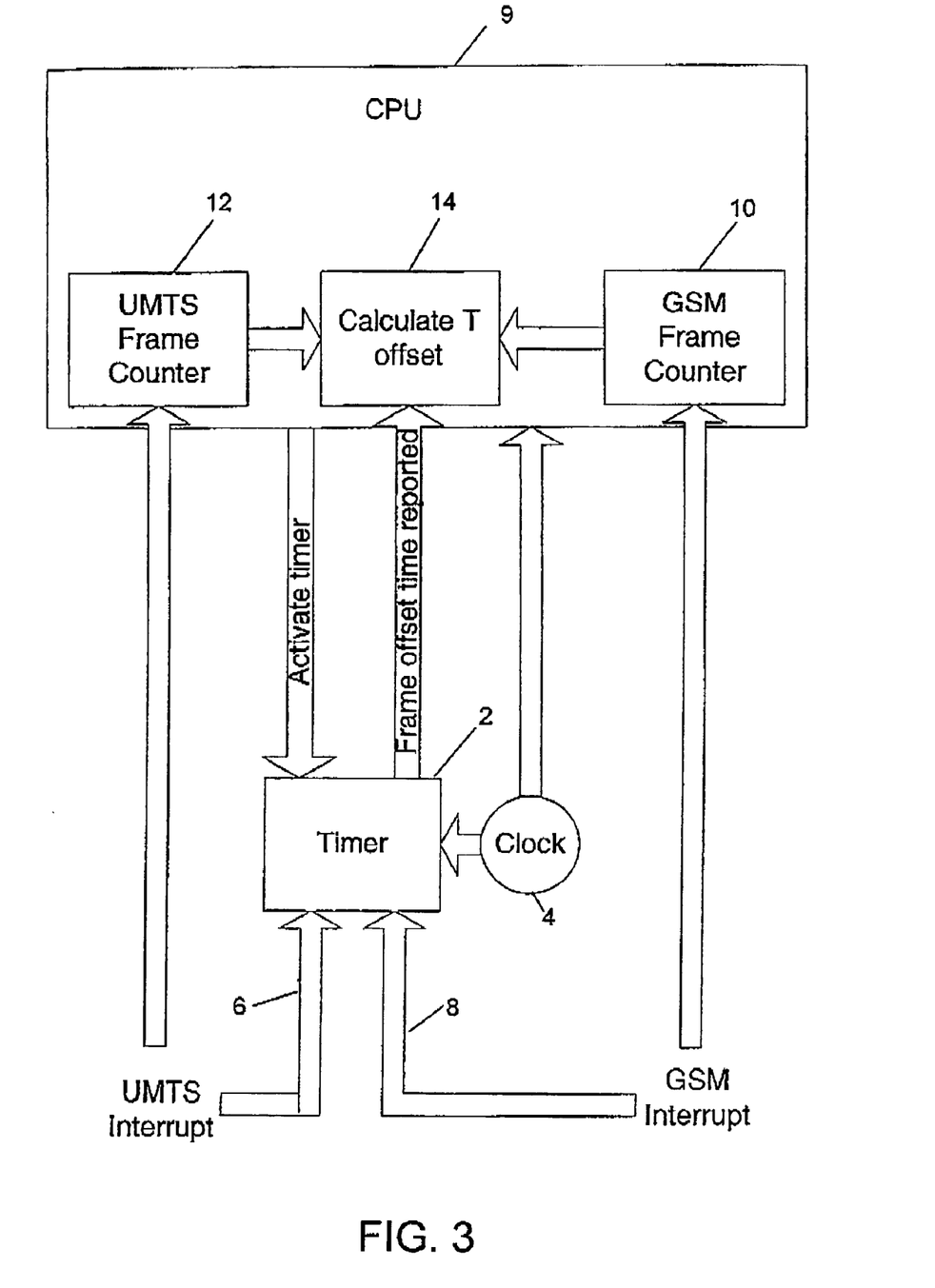
FIG. 3 shows a block diagram of apparatus for deriving the timing offset and hence the location of a mobile unit from signals received from a number of base stations.

The timer 2 is activated by a command from a CPU 9. Counting starts on receipt of a UMTS interrupt. It is then incremented at the cock rate until it is stopped by a GSM interrupt. When the timer stops, the count multiplied by the clock period (1/F) is the frame offset time. The CPU can then read the counter time and combine this value with knowledge of the clock rate and the current value of GSM and UMTS frame counters 10 and 12 to calculate the offset time to calculate $T_{offset}$ in unit 14. As can be seen, the three inputs to the calculate $T_{offset}$ unit 14 are the counts from the GSM frame counter 10 of the UMTS frame counter 12 and the frame offset time reported by the timer 2.

Figure 4:
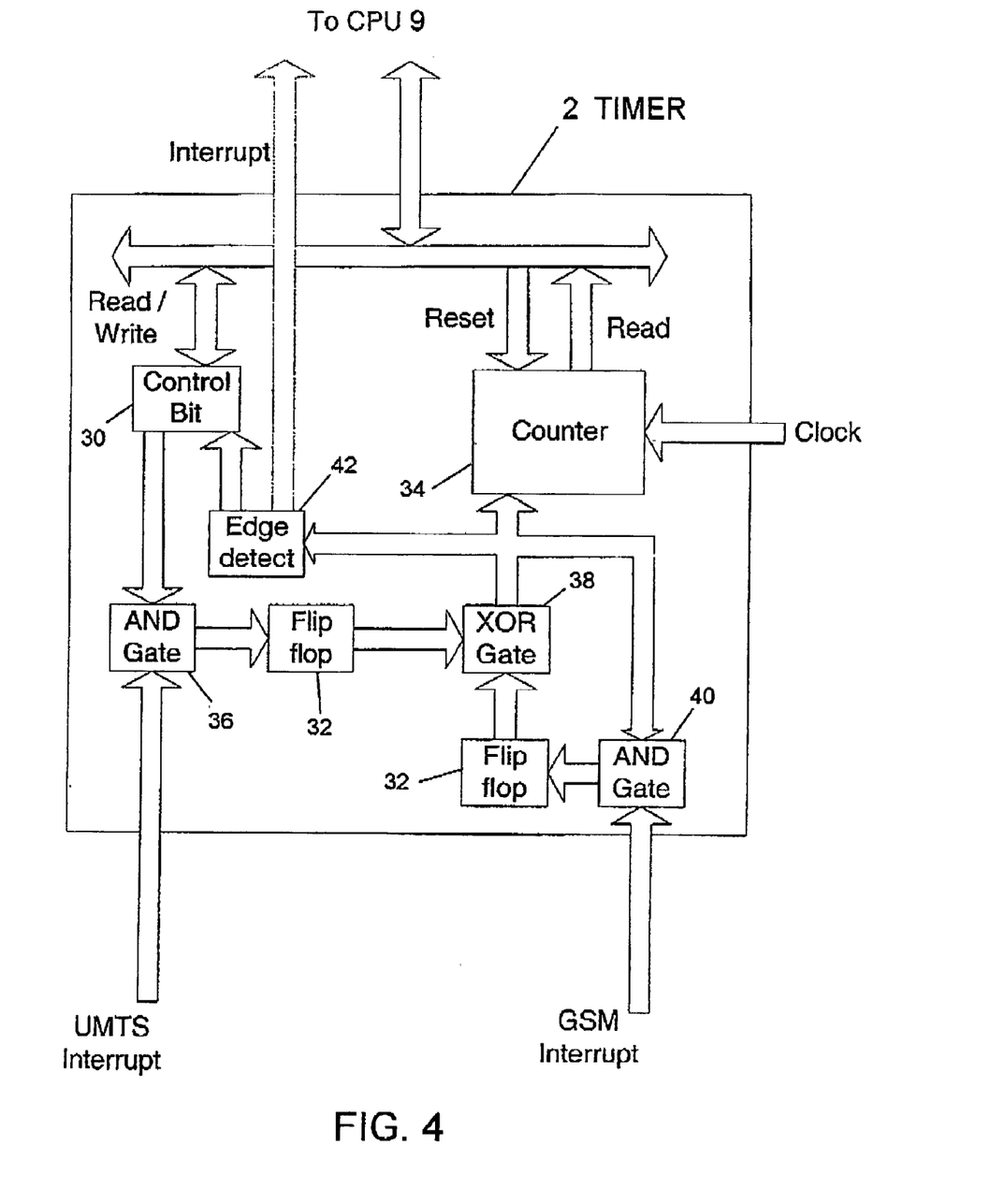
FIG. 4 shows a block diagram of the timer used in FIG. 3.

The counter module is implemented in a programmable semiconductor device—CPLD (Complex Programmable Logic Device), FPGA (Filed Programmable Gate Array) or similar and takes the form shown in FIG. 4.

(1) To initialize the counter module, the CPU writes a 1 to a control register 30. This action automatically resets a counter 34 to zero and initializes flip-flops to zero output.

(2) When the next UMTS interrupt arrives, it passes into an AND gate 36 where it is combined with the current control bit value. If the control is set to 1, then the AND output goes high for the duration of the interrupt pulse, and a flip-flop is triggered. The flip-flop output will then go high. This will cause the inputs to an XOR 38 gate to be different, and hence logic high will be output from the XOR 38. This logic high will start the counter running.

(3) When the next GSM interrupt arrives it passes into an AND gate 40 where it is combined with the current output value of the XOR gate 38. If this is high, then the AND 40 output goes high for the duration of the interrupt pulse, and a flip-flop is triggered. This will cause the inputs to the XOR gate 38 to be the same, and hence logic low will be output from the XOR. This will stop the counter.

(4) An edge detect circuit 42 detects the transition of the XOR 38 output from high to low and resets the control bit 30 to indicate that counting is complete As an alternative, the edge detect 42 can also provide an interrupt to the CPU to notify of count completion.

(5) The CPU reads the control bit, and if it is now zero, then reads the completed count. If the bit is not zero, the count is still underway so that the CPU must wait.

The electronics is arranged so that only the above sequence of events can generate a timer value. The control bit must be set before a UMTS interrupt can start the timer; the time must be running before the GSM Interrupt can stop it. It is impossible for a second UMTS interrupt to arrive before the first GSM interrupt because of the relative frames lengths in the two systems.

Note that all the electronic processes in this sequence have inherent delays. The electronics through which each of the interrupt signals passes has been made the same (AND, flip-flop, XOR) in an attempt to keep the delay on each signal the same. If the same delay applies to both signals, measuring an offset between them is still valid. Care must be taken over the physical implementation of the circuit to ensure that the delays are the same.

It is important to have a timer with sufficient resolution. The resolution must be better than that of E-OTD measurements to be reported since the accuracy of the timer dictates the maximum accuracy of location that can be determined.

For example, if there is a 10 NS resolution in the timer then this will correspond to three meters of radio propagation giving a potential error of three meters in the report made by the handset. Therefore, the maximum accuracy with which location can be stated is three meters although it will in fact be worse than this as the E-OTD calculation itself is not completely accurate.

E-OTD systems are typically accurate to tens of meters and the resolution of the timer must give a maximum error considerably less than this to avoid the errors simply compounding and being unacceptably large. Most mobile handsets available now have internal clock speeds of tens to hundreds of megahertz. An offset performed using a timer clock of a hundred megahertz give a resolution of 10 ns which as shown above is 3 m of radio propagation and this is acceptable.

It is important that the timer is able to measure between timebases regardless of which RAT the handset is currently using. The frequency of measurement depends on external factors such as movement which can cause the timebases within the handset to move out of step and, also, a new measurement is needed after every cell selection or handover on the primary RAT. If the secondary RAT timebase is linked to a particular cell then a measurement is needed after every change in the secondary RAT cell used for the synchronization.

In order to solve the problem of not having a a defined timebase on the second RAT, a free running timebase of the format used by the second RAT is established within the handset and clocked from the same source as the primary RAT. This establishes a baseline against which to measure It does, however, need to be tied to the baseline used for the primary RAT if measurements from the two systems are to be combined. This is achieved by driving the two timebases from the same master clock through appropriate dividers to ensure that the timebases stay in step. Thus, the frame offset value need only be measured when the serving cell on the primary RAT changes and at this point the primary RAT timebase undergoes a step change to synchronize with its new serving cell.

Alternatively, the secondary RAT timebase can be aligned with that of the best available cell on the secondary RAT. This is slightly more complicated as slippage between the two timebases is then possible. This will be caused by motion of the handset, reselection of the best cell, etc. Re-measurement of frame offset is then required in each of these cases. In order to obtain maximum accuracy, the frame offset should e measured alongside each E-OTD measurement. This is not desirable from a power saving point of view as it requires the radio CPU to be active for slightly longer than would otherwise be the case.

The above now enables us to convert between RAT timebases and therefore E-OTD measurements made on different RATs can be converted to a common format. This therefore increases the number of base stations available for user in a location calculation and improves the accuracy of the calculated location.

The remaining step is that of getting the location data back to the network This requires changes to the signalling layers on the handset, core network and fixed location units.

In one embodiment, the timebase conversions can be performed within the network. The handsets and the fixed location units measure and supply frame offset information, this can be either $T_{offset}$ as described above or can be frame offset plus the GSM and UMTS frame numbers at which it was measured. This can then be reported in addition to performing standard E-OTD measurements on the alternate RAT. Data is returned i the format used by the alternate RAT. This requires a change to the network signalling and specifically a new structure needs to be included as an option for E-OTD reporting. This new structure is the standard E-OTD report used by the alternate RAT with an additional field for the offset measurement. As either network can be the primary network in use, changes to signalling structure must be made in both networks.

Another option would be for the handset and fixed location units to perform the timebase conversion and thus avoid the need for a network change. Each would then be able to send data to the primary RAT in the correct format. This has the drawback that processing is moved to the handsets from the network thereby increasing power consumption. Also, changes to the network are still required as ID codes for cells on one RAT do not fit the E-OTD reporting measurement on the other RAT. Therefore, as network changes are needed in any case, it is expedient to also add the conversion functionality to the network.

If the only requirement is to allow data from the a secondary RAT to be passed to and used by the primary RAT and it is not be combined with this data of the primary RAT and there is no need to convert timebases. This is only true if the fixed location units were reporting the data in the same format as the handset. This is the situation where we wish to avoid using IPDL in UMTS and so E-OTD is measured only on the alternate RAT, (i.e. GSM) and reported to the network in GSM format. There is no UMTS data to be combined and so no conversion from GSM to UMTS timebase is required.

The invention claimed is:

1. A location system for use in a cellular communication network comprising:
   a first set of base stations transmittiug and receiving signals in a first communication format having a first time base;
   a second set of base stations transmitting and receiving signals in a second communication format having a second time base, wherein all base stations transmit known signals at predetermined times for use in deriving location data;
   a transmitting and receiving unit at a known location;
   a transmitting and receiving unit at an unknown location;
   means for determining times of arrival of the known signals from at least one base station in each of said first set of base stations and said second set of base stations at the known location;
   means for determining the times of arrival of signals from at least one base station from each of said first set of base stations and said second set of base stations at the unit at the unknown location;
   means for converting between said first time base and said second time base by measuring a time of a start of a transmission frame in said first time base, a frame number of said transmission frame in said first time base, a time of a start of transmission frame in said second time base, and a frame number of said transmission frame in said second time base;
   means for comparing timing differences between signals received at the unknown location and signals received at the known location from each base station from each of said first set of base stations and said second set of base stations; and
   means for determining the unknown location based upon said comparing.

2. The system as claimed in claim 1, in which the first set of base stations transmits using a Global System for Mobile Communications transmission network and the second set of base stations transmits using a Universal Mobile Transmission Standard transmission network.

3. The system as claimed in claim 2, in which the means for determining the unknown location is within one of the networks to which one of the sets of base stations is connected.

4. The system as claimed in claim 2, in which the means for determining the unknown location is in the unit at the unknown location.

5. The system as claimed in claim 1, in which the means for determining the unknown location is within one of the networks to which one of the sets of base stations is connected.

6. The system as claimed in claim 5, in which the means for determining the unknown location is in the unit at the unknown location.

7. The system as claimed in claim 1, in which the means for determining the unknown location is in the unit at the unknown location.

8. The system as claimed in claim 1, in which one of the sets of base stations transmits using a Global System for Mobile Communications transmission network and the second set of base stations transmits using a Universal Mobile Transmission Standard transmission network.

9. The system as claimed in claim 1, in which the means for determining the unknown location is within one of the networks to which one of the sets of base stations is connected.

10. The system as claimed in claim 1, in which the means for determining the unknown location is in the unit at the unknown location.

11. A dual mode transmitting and receiving unit for use with two cellular communication networks including a first cellular communication network having a first communication format with a first time base and a second cellular communication network having a second communication format with a second time base, each comprising a plurality of base stations for transmitting and receiving signals from units, the unit comprising means for converting between said first time base and said second time base by measuring a time of a start of a transmission frame in said first time base, a frame number of said transmission frame in said first time base, a time of a start of transmission frame in said second time base, and a frame number of said transmission frame in said second time base and deriving location data based upon communications from both cellular communication networks and said conversion.

12. A dual mode transmitting and receiving unit, comprising:
   a transceiver for communicating with a first set of stations using a first communication format having a first time base and a second set of base stations using a second communication format having a second time base;
   means for converting between said first time base and said second time base by measuring a time of a start of a transmission frame in said first time base, a frame number of said transmission frame in said first time base, a time of a start of transmission frame in said second time base, and a frame number of said transmission frame in said second time base; and
   means for determining a location of said dual mode transmitting and receiving unit based upon a time of arrival of signals from both of said first set of base stations and said second set of base stations at a known location and a time of arrival of signals from both of said first set of base stations and said second set of base stations at said dual mode transmitting and receiving unit.

13. A location system for use in a cellular communication network comprising:
   a transmitting and receiving unit at a known location;
   a transmitting and receiving unit at an unknown location;
   a first timer that determines a time of arrival of signals from a first set of base stations transmitting and receiving signals in a first communication format having a first time base and from a second set of base stations transmitting and receiving signals in a second communication format having a second time base at the known location;
   a second timer that determines a time of arrival of signals from said first set of base stations and from said second set of base stations at the unknown location;
   a processor that converts between said first time base and said second time base by measuring a time of a start of a transmission frame in said first time base, a frame number of said transmission frame in said first time base, a time of a start of transmission frame in said second time base, and a frame number of said transmission frame in said second time base and that determines the unknown location based upon the time of arrival of the signals from both of said first set of base stations and said second set of base stations at the known location and the time of arrival of the signals at the unknown location.

14. The system of claim 13, wherein at least one of said first timer and said second timer comprises:
   a first set of electronics receiving said signals from said first set of base stations; and
   a second set of electronics receiving said signals from said second set of base stations.

15. The system of claim 14, wherein a delay through the first set of electronics is substantially the same as a delay through the second set of electronics.

16. The system of claim 14, wherein at least one of said first set of electronics and said second set of electronics comprises an AND gate and a flip flop.

17. The system of claim 14, wherein said at least one of said first timer and said second timer further comprises:
   an Exclusive OR gate receiving signals from each of said first set of electronics and said second set of electronics; and
   a counter in communication with said Exclusive OR gate.

18. The system of claim 13, wherein said processor determines the unknown location based upon an offset between the time of arrival of the signals at the known location and the time of arrival of the signals at the unknown location.

* * * * *